(12) United States Patent
Ghasempoor

(10) Patent No.: US 11,917,224 B2
(45) Date of Patent: Feb. 27, 2024

(54) DEVICE, SYSTEM AND METHOD FOR ALLOCATING RESOURCES FOR VIDEO STREAMING

(71) Applicant: ATCITI CORP., Markham (CA)

(72) Inventor: Alireza Ghasempoor, Markham (CA)

(73) Assignee: ATCITI CORP., Markham (CA)

( * ) Notice: Subject to any disclaimer, the term of this patent is extended or adjusted under 35 U.S.C. 154(b) by 635 days.

(21) Appl. No.: 17/037,989

(22) Filed: Sep. 30, 2020

(65) Prior Publication Data
US 2022/0103879 A1 Mar. 31, 2022

(51) Int. Cl.
*H04N 21/24* (2011.01)
*H04N 21/647* (2011.01)

(52) U.S. Cl.
CPC ..... *H04N 21/2402* (2013.01); *H04N 21/2408* (2013.01); *H04N 21/64738* (2013.01); *H04N 21/64769* (2013.01)

(58) Field of Classification Search
None
See application file for complete search history.

(56) References Cited

U.S. PATENT DOCUMENTS

| | | | |
|---|---|---|---|
| 11,005,780 | B2 | 5/2021 | Ghasempoor |
| 2002/0184382 | A1 | 12/2002 | Engel |
| 2012/0201255 | A1 | 8/2012 | Manor et al. |
| 2013/0227625 | A1 | 8/2013 | Forsman et al. |
| 2013/0254341 | A1 | 9/2013 | Ramakrishnan |
| 2018/0287956 | A1 | 10/2018 | Bryc et al. |
| 2019/0014356 | A1 | 1/2019 | Rieger et al. |

FOREIGN PATENT DOCUMENTS

| | | |
|---|---|---|
| EP | 2817971 A1 | 12/2014 |
| WO | WO-2006118502 A1 | 11/2006 |

OTHER PUBLICATIONS

PCT/IB2020/061454, Device, System and Method for Allocating Resources for Video Streaming, Dec. 3, 2020.
PCT/IB2021/058943 Device, System and Method for Allocating Resources for Video Streaming, Sep. 29, 2021.
U.S. Appl. No. 17/481,439, Device, System and Method for Allocating Resources for Video Streaming, filed Sep. 22, 2021.
USPTO, Notice of Allowance and Fees Due, dated Mar. 30, 2021 re U.S. Appl. No. 17/109,224.

*Primary Examiner* — Walter J Divito
(74) *Attorney, Agent, or Firm* — PERRY + CURRIER, INC.

(57) ABSTRACT

A device, system and method for allocating resources for video streaming is provided. A device determines, respective differences between reserved and actual allocated resources for videos provided to a streaming system by client devices, and selects, at the streaming system, from a plurality of discrete selectable allocated resources available at the streaming system, first reserved aggregate allocated resources based on the actual allocated resources for the videos, the first reserved aggregate allocated resources for streaming the videos to video-playing devices. The device monitors used resources for streaming the videos to the video-playing devices and, in response to determining that the used resources are within a threshold value of the first reserved aggregate allocated resources: from the plurality of discrete selectable allocated resources, selects second reserved aggregate allocated resources based on the respective differences between the reserved allocated resources and the actual allocated resources for the videos.

20 Claims, 8 Drawing Sheets

DEVICE, SYSTEM AND METHOD FOR ALLOCATING RESOURCES FOR VIDEO STREAMING

BACKGROUND

Videos are often provided to streaming systems by client devices for streaming on-demand by video streaming devices. However, allocation of resources for streaming the videos can be problematic. For example, planning for resources used to stream the videos must be made in a balanced manner, to balance expected demand for the videos with actual demand, such that bandwidths and/or resources allocated for streaming the videos are neither too high (e.g. which may lead to a waste of allocated bandwidth), nor too low (e.g. such that the streaming of the videos exceed an allocated bandwidth, which may lead to slow streaming of the videos and/or other videos).

BRIEF DESCRIPTIONS OF THE DRAWINGS

For a better understanding of the various examples described herein and to show more clearly how they may be carried into effect, reference will now be made, by way of example only, to the accompanying drawings in which.

Figure 1:
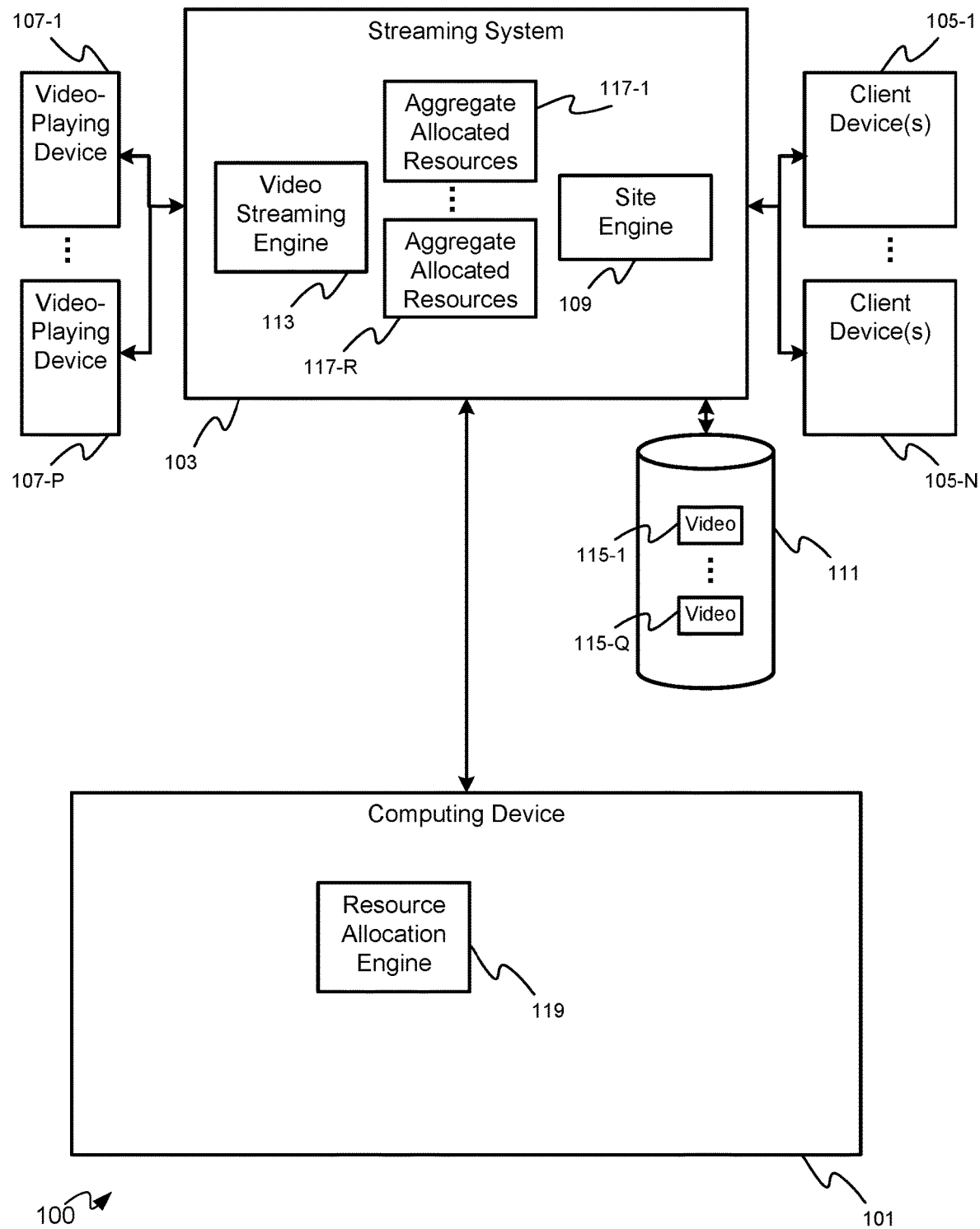
FIG. 1 depicts a system for allocating resources for video streaming, according to non-limiting examples.
Figure 5:
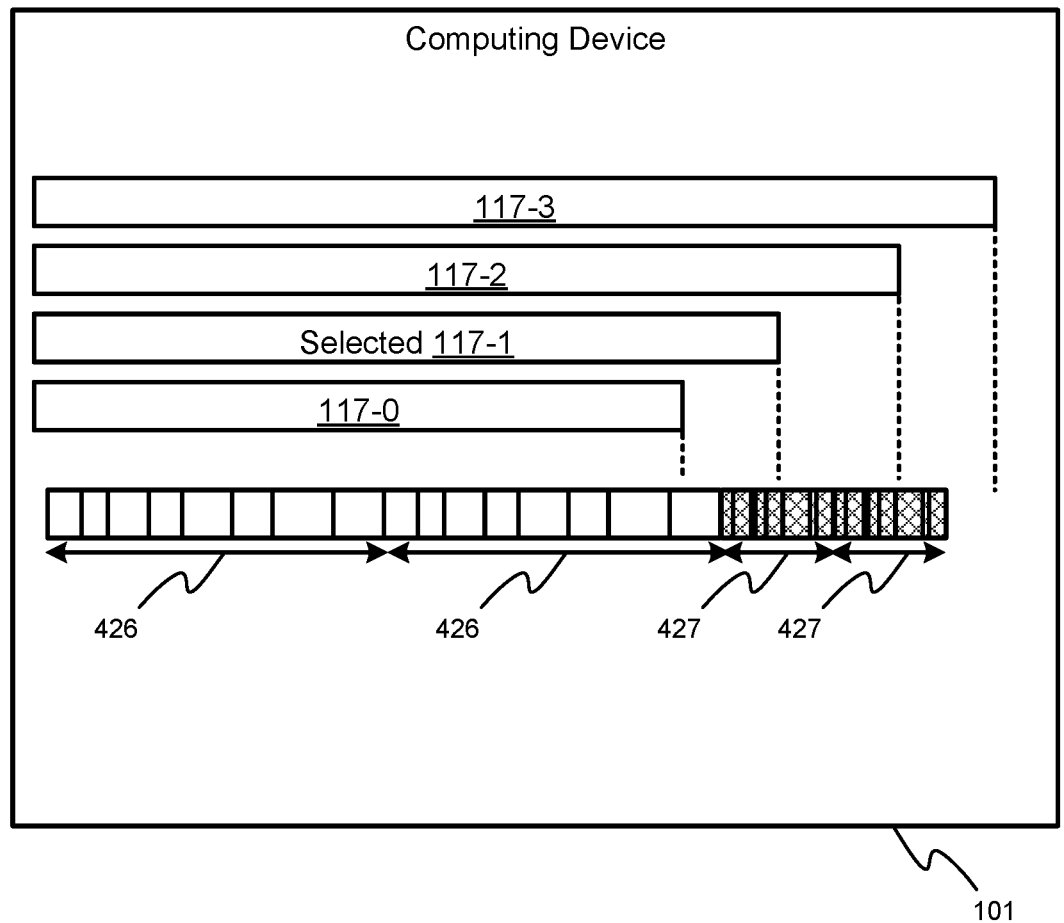

FIG. 5 further depicts the example of the method for allocating resources for video streaming being implemented in components of the system of FIG. 1, and according to non-limiting examples.

Figure 6:
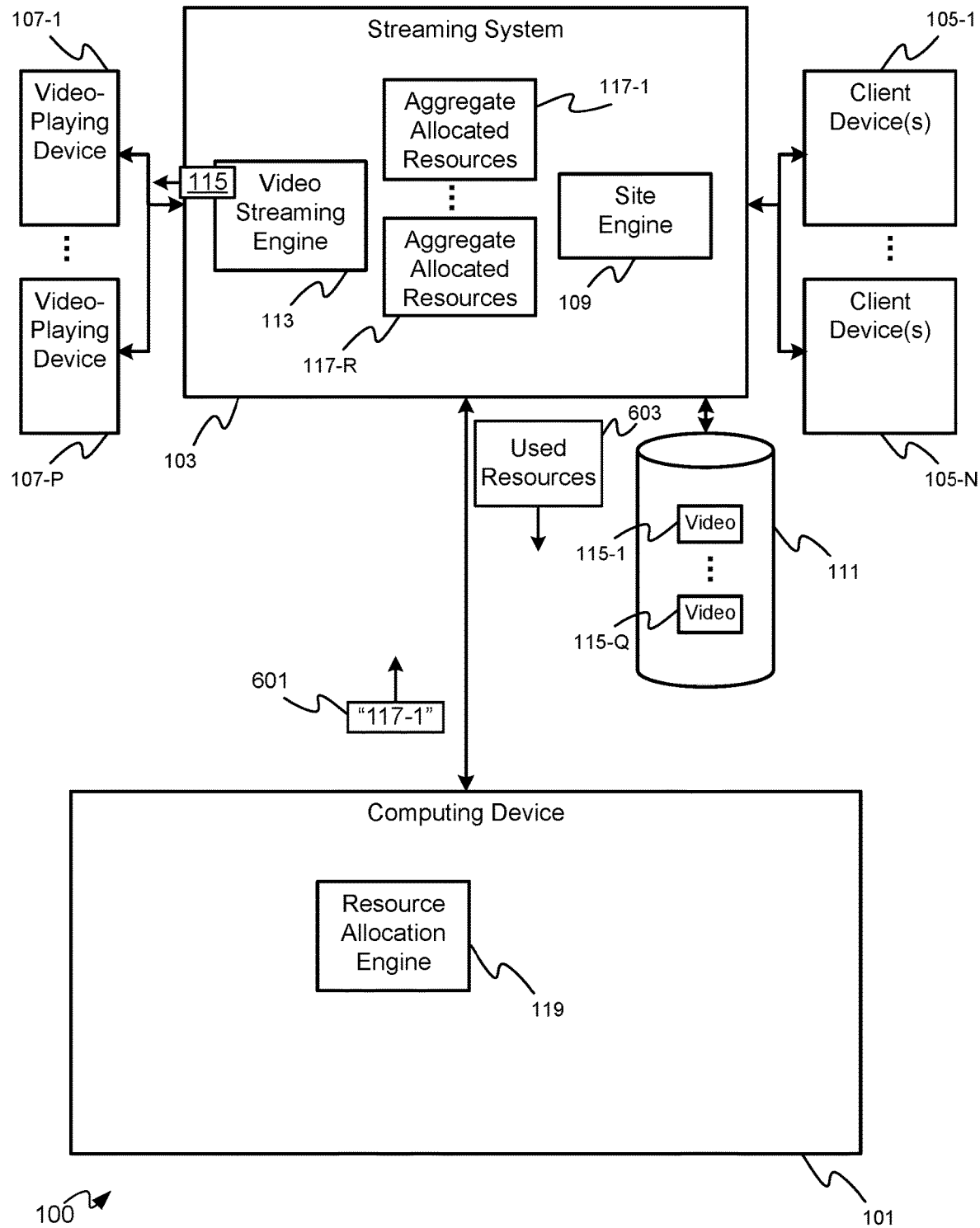

FIG. 6 further depicts the example of the method for allocating resources for video streaming being implemented in components of the system of FIG. 1, and according to non-limiting examples.

Figure 7:
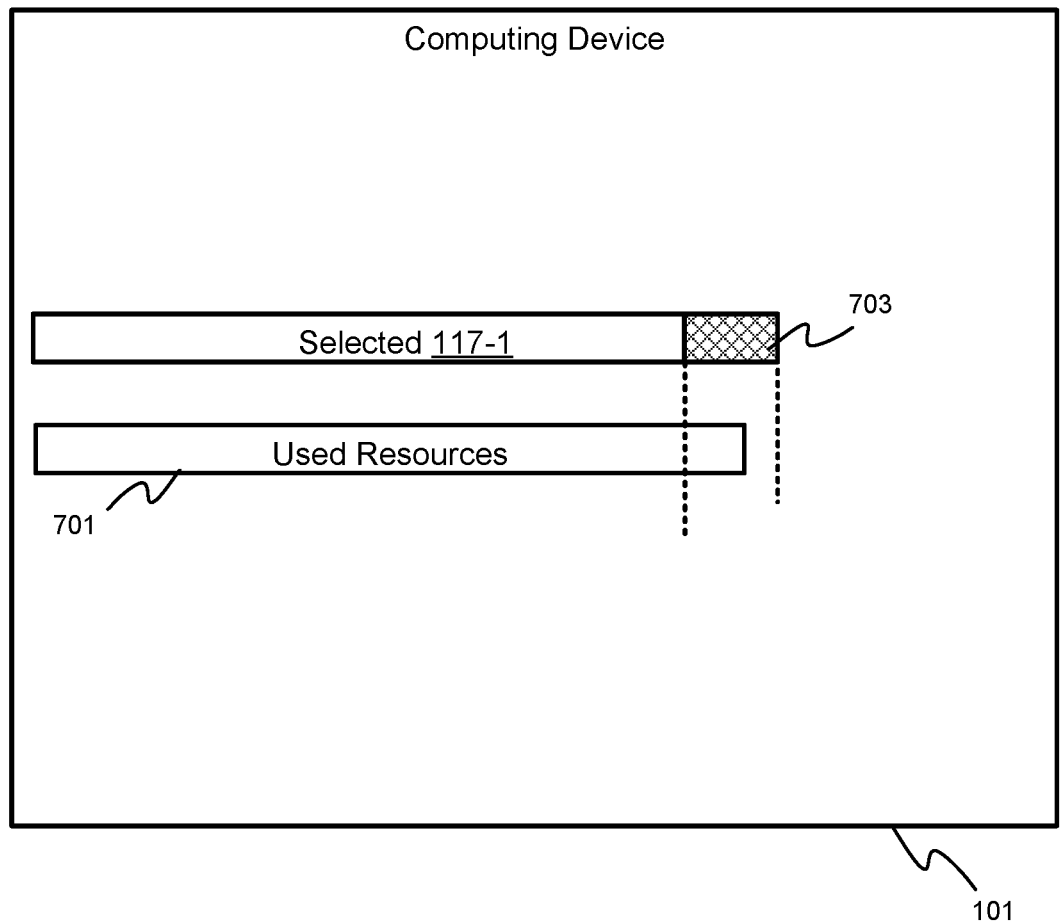

FIG. 7 further depicts the example of the method for allocating resources for video streaming being implemented in components of the system of FIG. 1, and according to non-limiting examples.

Figure 8:
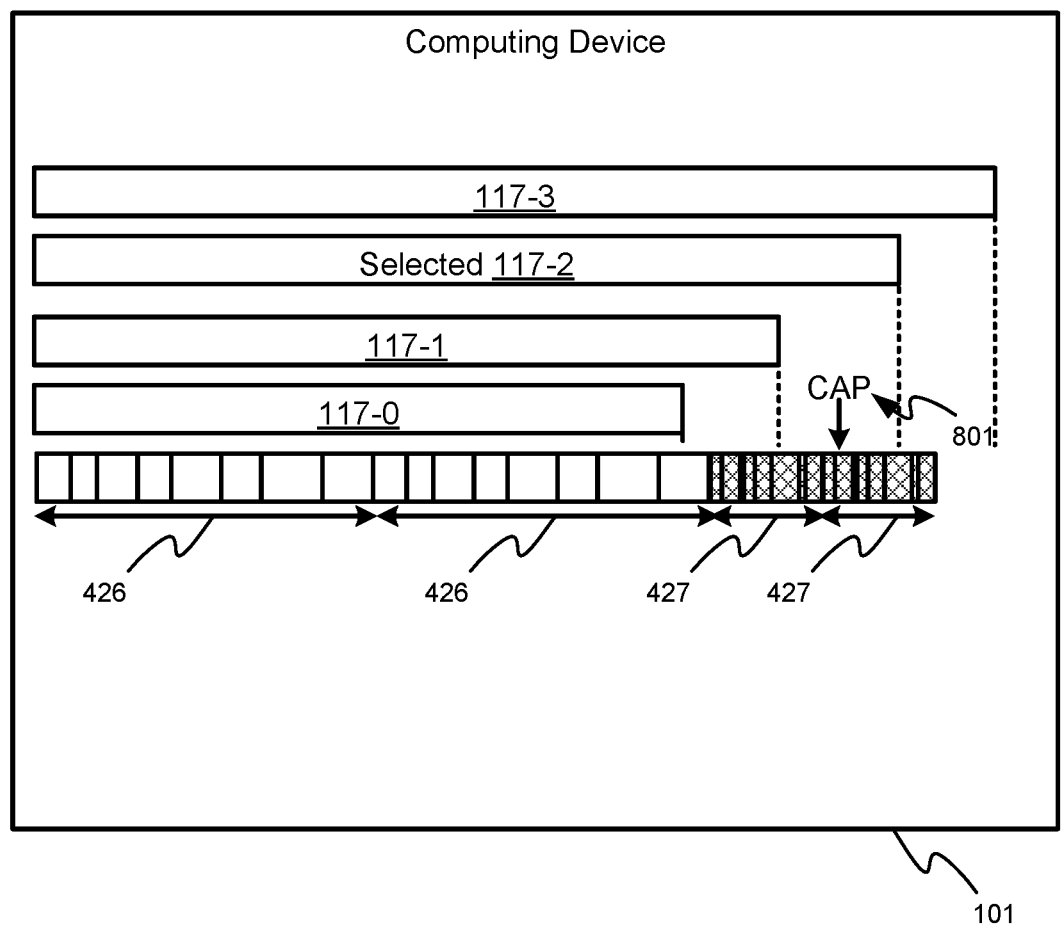

FIG. 8 further depicts the example of the method for allocating resources for video streaming being implemented in components of the system of FIG. 1, and according to non-limiting examples.

DETAILED DESCRIPTION

Videos are often provided to streaming systems by client devices for streaming on-demand by video streaming devices. However, allocation of resources for streaming the videos can be problematic. For example, planning for resources used to stream the videos must be made in a balanced manner, to balance expected demand for the videos with actual demand, such that bandwidths and/or resources allocated for streaming the videos are neither too high (e.g. which may lead to a waste of allocated bandwidth), nor too low (e.g. such that the streaming of the videos exceed an allocated bandwidth, which may lead to slow streaming of the videos and/or other videos).

The situation may be exacerbated by a client device providing a video, which is shorter in length than a reserved allocated resource. For example, an operator of the client device may reserve allocated resources for streaming of a 10 second video, but provide only a 7 second video; as such, while allocated resources for streaming of a 10 second video may be reserved at the streaming system, actual allocated resources used at the streaming system may be for a 7 second video. A computing device managing allocation of resources at the streaming system, for example on behalf of the client devices, for a plurality of videos, which have respective actual allocated resources that are less than reserved allocated resources, may hence determine that reserving allocated resources at the streaming system, based on the allocated resources reserved by the client device, results in too many resources being allocated, which can lead to the aforementioned issues. As such the computing device may reserve allocated resources at the streaming system based on the actual allocated resources of the videos, however such allocation may be too low.

In particular, some streaming systems provide a plurality of discrete selectable allocated resources from which a computing device may select. For example, a selectable allocated resource, of the plurality of discrete selectable allocated resources, may correspond to an amount of bandwidth reserved for streaming videos in a given time period, such as a month, and the like. As such, each of the plurality of discrete selectable allocated resources may comprise increasing discrete amounts of bandwidth that may be selected by the computing device for streaming the videos in a given time period.

Hence, when reserving allocated resources at the streaming system, the computing device may select a first reserved aggregate allocated resources from a plurality of discrete selectable allocated resources available at the streaming system.

Thereafter, the videos may be streamed, for example on-demand, or pushed, from the streaming system to video streaming devices, such personal computers, laptop computers, mobile devices, video display devices, electronic billboards, video kiosks, and the like.

As the computing device may initially have no statistics on demand for the videos, the selected first reserved aggregate allocated resources may be too high or too low. However, the selected first reserved aggregate allocated resources may be selected based on an estimated demand for the videos, for example an estimated number of streams of the videos, using the actual allocated resources for videos, over the given time period. In a simple example, if a total length of all the videos provided by the client devices is 26 minutes, and estimated number of streams of the videos is 100 streams per month per video, the selected first reserved aggregate allocated resources may be a value that corresponds to streaming of at least 2600 minutes of video per month (and may also be based on other factors, such as the resolution of the streaming of the videos, and the like), with for example, a factor to account for error, such as 10% (e.g. or 2860 minutes). For example, the selected first reserved aggregate allocated resources may be one of the plurality of discrete selectable allocated resources, which corresponds to 2860 minutes of streaming per month and/or one of the plurality of discrete selectable allocated resources, which corresponds to greater than 2860 minutes is greater than, and closest to, 2860 minutes of streaming per month.

However, the selected first reserved aggregate allocated resources is generally selected to be less than the reserved allocated resources for the videos. For example, if the total length of all the videos is 26 minutes, but the client devices have reserved 30 minutes, in total, for the videos (e.g. an aggregate difference of 4 minutes), the selected first reserved aggregate allocated resources is generally selected to be less than the 3000 minutes (e.g. 30 minutes times 100 times per month) and/or less than 3000 minutes plus 10% thereof (e.g. 3300 minutes).

Furthermore, while allocated resources are described in this example with respect to minutes of videos, such allocated resources may be provided as any suitable parameter including, but not limited, bits and/or bytes of data to be streamed, for example for a given time period.

As such, the computing device generally monitors used resources for streaming the videos to the video-playing devices from the streaming system; for example, the computing device may receive reports from the streaming system that indicate used resources. In general, the used resources exceeding the first reserved aggregate allocated resources (e.g. demand for the videos was higher than estimated) may result in problems with videos being streamed. In a worst case scenario, for example, the streaming system may stop streaming the videos once the used resources meet or exceed the first reserved aggregate allocated resources; however, even when the streaming system continues to stream the videos, the streaming system may apply additional restrictions and/or penalties for streaming the videos (e.g. streaming at slower speeds, increasing cost, and the like).

As such, the computing device may determine that the used resources are within a threshold value of the first reserved aggregate allocated resources (and/or is higher than the first reserved aggregate allocated resources), and, in response, select second reserved aggregate allocated resources, from the plurality of discrete selectable allocated resources, for streaming the videos to the video-playing devices. However, such a selection of the second reserved aggregate allocated resources is generally based on the respective differences between the reserved allocated resources and the actual allocated resources for the videos, such that, for example, the second reserved aggregate allocated resources does not exceed the reserved allocated resources of the videos (e.g. which may also take into account an estimated number of streams of the videos in a given time period for the second reserved aggregate allocated resources, and the like).

Put another way, the selected second reserved aggregate allocated resources may be selected similar to the selected first reserved aggregate allocated resources, but based on a larger number of streams per month than initially estimated, but still limited by the reserved allocated resources and the actual allocated resources, and/or an aggregate difference therebetween.

An aspect of the present specification provides a method comprising: determining, at a computing device, respective differences between reserved allocated resources and actual allocated resources for videos provided to a streaming system by client devices; selecting, via the computing device, at the streaming system, first reserved aggregate allocated resources, from a plurality of discrete selectable allocated resources available at the streaming system, the first reserved aggregate allocated resources selected based on the actual allocated resources for the videos, the first reserved aggregate allocated resources for streaming the videos to video-playing devices; monitoring, via the computing device, used resources for streaming the videos to the video-playing devices from the streaming system; and in response to determining, via the computing device, that the used resources are within a threshold value of the first reserved aggregate allocated resources: selecting, via the computing device, second reserved aggregate allocated resources, from the plurality of discrete selectable allocated resources, for streaming the videos to the video-playing devices, the second reserved aggregate allocated resources selected based on the respective differences between the reserved allocated resources and the actual allocated resources for the videos.

Another aspect of the present specification provides a device comprising: a communication interface configured to communicate with a streaming system; and, a controller configured to: determine respective differences between reserved allocated resources and actual allocated resources for videos provided to the streaming system by client devices; select, via the communication interface, at the streaming system, first reserved aggregate allocated resources, from a plurality of discrete selectable allocated resources available at the streaming system, the first reserved aggregate allocated resources selected based on the actual allocated resources for videos, the first reserved aggregate allocated resources for streaming the videos to video-playing devices; monitor, via the communication interface, used resources for streaming the videos to the video-playing devices from the streaming system; and in response to determining that the used resources are within a threshold value of the first reserved aggregate allocated resources: select, via the communication interface, second reserved aggregate allocated resources, from the plurality of discrete selectable allocated resources, for streaming the videos to the video-playing devices, the second reserved aggregate allocated resources selected based on the respective differences between the reserved allocated resources and the actual allocated resources for the videos.

A further aspect of the present specification provides a non-transitory computer-readable medium comprising instructions that, when executed by a processor, causes the processor to implement a method comprising: determining respective differences between reserved allocated resources and actual allocated resources for videos provided to a streaming system by client devices; selecting at the streaming system, first reserved aggregate allocated resources, from a plurality of discrete selectable allocated resources available at the streaming system, the first reserved aggregate allocated resources selected based on the actual allocated resources for the videos, the first reserved aggregate allocated resources for streaming the videos to video-playing devices; monitoring, used resources for streaming the videos to the video-playing devices from the streaming system; and in response to determining that the used resources are within a threshold value of the first reserved aggregate allocated resources: selecting second reserved aggregate allocated resources, from the plurality of discrete selectable allocated resources, for streaming the videos to the video-playing devices, the second reserved aggregate allocated resources selected based on the respective differences between the reserved allocated resources and the actual allocated resources for the videos.

Attention is next directed to FIG. 1, which depicts a system 100 for allocating resources for video streaming. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

As depicted, the system 100 comprises a computing device 101 for allocating resources for video streaming. For example, as depicted, the system 100 comprises a streaming system 103 in communication with the computing device 101, an integer number "N" of client devices 105-1, . . . 105-N, and an integer number "P" of video-playing devices 107-1, . . . 107-P.

The client devices 105-1, . . . 105-N will be interchangeably referred to hereafter, collectively, as the client devices 105 and, generically, as a client device 105. This numbering scheme will be used throughout the present specification. For example, the video-playing devices 107-1, . . . 107-P will be interchangeably referred to hereafter as the video-playing devices 107 and/or as a video-playing device 107.

While details of the computing device 101 are described in further detail below with respect to FIG. 2, the computing device 101 generally comprises any suitable number of servers, cloud computing devices, personal computers, laptop computers, and the like, for allocating resources for video streaming, for example at the streaming system 103, and which may be performed on behalf of the client devices 105. Furthermore, while not depicted, the computing device 101 may comprise a client device 105 and/or the computing device 101 may comprise a video-playing device 107. Put another way, while the devices 101, 105, 107 are depicted as being different from one another, in some examples, functionality of two or more of the devices 101, 105, 107 may be combined. Indeed, in some examples, a client device 105 may comprise a video-playing device 107, and vice versa.

However, in a specific example, the computing device 101 is different from the streaming system 103, and in this specific example, the system 100 includes at least one client device 105 that is different from the computing device 101, and at least one video-playing device 107 from a client device 105. In such specific example, the computing device, the streaming system 103, at least one client device 105 and at least one video playing device 107 are all different from each other. Regardless, the streaming system 103 is generally understood to host the videos 115, but is not otherwise tasked with advertising the videos 115; indeed entities and/or users associated with the client devices 105 and the video playing devices 107, the computing 101 is understood to be associated with managing the videos 115 (e.g. and not the streaming system 103). As such, the computing device 101 and the streaming system 103 are understood to be different from television streaming systems which advertise and provide television shows, movies, and the like; for example, such television streaming systems do not generally include client devices which reserve resources for videos, where reserved allocated resources and actual allocated resources for videos, provided to a streaming system by client devices, are different.

The streaming system 103 generally comprises any suitable number of servers, cloud computing devices, and the like, which may store and stream videos, as described in more detail below. The streaming system 103 may perform other functions, such as hosting websites, and the like, which may act as an interface between the streaming system 103 and the computing device 101 and the client devices 105. For example, as depicted, the streaming system 103 comprises a site engine 109, which may be used to receive and store videos, for example at a memory 111 (e.g. which may include one or more memories provided in the form of one or more databases, and which may be internal and/or external to the streaming system 103). The streaming system 103 further comprises a video streaming engine 113 for providing videos 115-1 . . . 115-Q (e.g. as depicted, as stored at the memory 111) to the video-playing devices 107. The videos 115-1 . . . 115-Q are referred to hereafter as the videos 115 and/or a video 115. The streaming system 103 may comprise other engines to perform other functionality thereof, for example billing engines, and the like. In some examples, the functionality of the engines 109, 113 may be combined into one (or more engines).

As used herein, the term "engine" refers to hardware (e.g., a processor, such as a central processing unit (CPU) an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

In some examples, the streaming system 103 may comprise the computing device 101 (e.g. as a component of the site engine 109, and the like).

The client devices 105 may comprise any suitable device configured to provide a video 115 to the streaming system 103 for streaming. The client devices 105 may communicate with the computing device 101 via the streaming system 103 (e.g. via the site engine 109) and/or the streaming system 103 may act as an interface between the client devices 105 and the computing device 101. The client devices 105 may comprise personal computers, laptop computers, mobile devices, and/or any other suitable type of devices including, but not limited to, servers, cloud computing devices, and the like. In a particular example, the client devices 105 may access a website at the streaming system 103 (e.g. hosted by the site engine 109) via a respective local browser application and/or engine installed at the client devices 105, to provide and/or upload a video 115 to the streaming system 103 (e.g. for storage at the memory 111 and for streaming to the video-playing devices 107).

For example, a client device 105 may upload a video 115 (or videos 115) to the streaming system 103 and/or a client entity may request that the entity associated with the computing device 101 generate and provide a respective video 115 (e.g. in which case, the computing device 101 may act as a proxy client device 105 on behalf of such a client entity).

In particular, when providing a video 115 and/or in conjunction with providing a video 115, a client device 105 may reserve allocated resources for the video 115, but actual allocated resources for the video 115 may be less than reserves allocated resources. In a simple example, the computing device 101 (e.g. via a website provided via the site engine 109) may prompt the client device 105 to select a length of a video 115 to be uploaded, for example from a plurality of fixed predetermined lengths, such as 5 seconds, 10 seconds, 15 seconds, 20 seconds, 25 seconds, and the like. The client device 105 may select a predetermined length, which is greater than, or equal to, a length of the video 115, and upload the video 115. While the selected predetermined length may be associated with a respective cost, it is understood that the selected predetermined length is generally used for allocated streaming resource planning by the computing device 101. Furthermore, as the video 115 may be less than the selected predetermined length, the difference between the actual length and the selected predetermined length may be used by the computing device 101 for allocated streaming resource planning, as described in more detail below.

The video-playing devices 107 may comprise personal computers, laptop computers, mobile devices, video display devices, video kiosks, and/or any suitable device to which a video 115 may be streamed. Such streaming may occur on demand, for example via a video-playing device 107 accessing a website (e.g. via a respective local browser applications and/or engine installed at the video-playing devices 107 accessing the site engine 109) to select a video and/or videos for streaming and which, once selected, are streamed to a video-playing device 107 via the video streaming engine 113. In yet further examples, a video-playing device 107 may include a mobile device (e.g. a smart-phone, and the like) using a locally installed application (e.g. an "app") to request and receive videos streamed thereto from the streaming system 103, for example on-demand.

In yet further examples, a video-playing device 107 may comprise a video display device, and the like, such as a device, which includes a display screen installed in a public space, and which may include, but is not limited to, electronic billboards installed in outdoor spaces, video kiosks installed in indoor public spaces, and the like. However, such electronic billboards, video kiosks and the like may be installed in any suitable space, indoor or outdoor, public or not private, and the like. In some of these examples, the streaming system 103 may be configured to stream videos 115 provided by the client devices 105 to such a video-playing device 107 via pushing (e.g. rather than on demand) for example in a loop. Such video display devices may be operated by the same entity operating the computing device 101, and/or another entity.

Hence, streaming of the videos 115 may occur on-demand and/or via pushing. Furthermore, while streaming of the videos 115 has been described with respect to specific types of the video-playing device 107 requesting the videos 115 on-demand (e.g. pulling), or receiving the videos 115 via pushing, pushing or pulling of the videos 115 may occur at any suitable type of video-playing device 107. For examples, videos 115 may be pushed to a personal computer, laptop computer, mobile device, and the like, upon such a device accessing a website via a browser and/or opening an app. Similarly, videos 115 may be requested by a video display device, which includes an electronic billboard, a video kiosk, and the like.

As depicted the system 100 includes a number "N" of the client devices 105, a number "P" of video-playing devices 107, and a number "Q" of the videos 115. The number "N" of the client devices 105 may comprise any suitable number of the client devices 105, and furthermore the number "N" of the client devices 105 may vary with time. For example, it is generally understood that the computing device 101 generally manages streaming of the videos 115 and specifically manages allocation of resources for streaming of the videos 115 at the streaming system 103. Furthermore, the computing device 101 may be operated by, and/or associated with, an entity that is providing a service to entities operating the client devices 105 and/or associated with the client devices 105. For example, the computing device 101 may be providing a service to the client devices 105 that targets streaming of the videos 115 to certain regions (e.g. geographic regions) based on location of the video-playing devices 107, such that viewers of the video-playing devices 107 may view content of the videos 115 based on region. For example, the videos 115 may include content that is particular to a given region, whether due to pre-determined licensing agreements, specific content in the videos 115, and the like; for example, a particular video 115 may include content pertaining to a store, a restaurant, a tourist attraction, and the like, located in a given region, and a client entity associated with a client device 105 may engage the entity associated with the computing device 101 to stream the particular video 115 to video-playing devices 107 in the given region. Such regional targeting of video-playing devices 107 may occur by associating videos 115 with regions at the memory 111 (e.g. during an upload thereto) and the streaming system 103 determining a region in which a video-playing device 107 is located via an associated network address, and the like.

As such, the number "N" of the client devices 105 may vary with time, based on numbers of client entities that engage, or disengage, the entity associated with the computing device 101 to provide respective videos 115.

Similarly, the number "Q" of the videos 115 may vary with time, based on numbers of videos 115 provided by the client devices 105. In some examples, the number "Q" of the videos 115 may be the same as the number "N" of the client devices 105 (e.g. each of the client devices 105 may provide a respective video 115). However, in other examples, the number "Q" of the videos 115 may be larger than the number "N" of the client devices 105 (e.g. one or more of the client devices 105 may provide more than one respective video 115). In yet further examples, the number "Q" of the videos 115 may be less than the number "N" of the client devices 105 (e.g. one or more of the client devices 105 may engage the entity associated with the computing device 101 but may not have yet provided a respective video 115). Regardless, the number "Q" of the videos 115 may be any suitable number.

Similarly, the number "P" of the video-playing devices 107 may vary with time, for example as the video-playing devices 107 access a website and/or execute an application for receiving the videos 115 and/or as the video-playing devices 107 come on-line and/or go off-line. Regardless, the number "P" of the video-playing devices 107 may be any suitable number.

As depicted, the streaming system 103 may generally include a plurality of discrete selectable allocated resources 117-1 . . . 117-R (e.g. selectable allocated resources 117) from which the computing device 101 may select. Each of the discrete selectable allocated resources 117 may correspond to a specific amount of streaming resources that may be reserved for streaming the videos 115, and each of the selectable allocated resources 117 may be different from others of the selectable allocated resources 117. For example, the discrete selectable allocated resources 117 may comprise lowest discrete selectable allocated resources 117, which is less than next discrete selectable allocated resources 117, which is less than yet next discrete selectable allocated resources 117, and so on. As depicted, for example, there are an integer number "R" of selectable allocated resources 117 from which the computing device 101 may select, and the number "R" of selectable allocated resources 117 may be any suitable number of selectable allocated resources 117, depending on offerings that the streaming system 103 may make available to computing devices of entities using the streaming system 103 for streaming respective videos 115. Values of the selectable allocated resources 117 are understood to be stored at a memory of the streaming system 103 (e.g. which may include, but is not limited to, the memory 111 and/or another memory) and accessed and/or provided to the computing device 101, for example upon request, and the like. Furthermore, the discrete selectable allocated resources 117 may be provided per a given time period; for example, a value of a discrete selectable allocated resources 117 may comprise a number of bits and/or bytes and/or minutes per month reserved for streaming videos.

For example, the streaming system 103 may provide the plurality of discrete selectable allocated resources 117, as a plurality of "packages" from which the computing device 101 may select to reserve associated streaming resources for streaming the videos 115 per month and/or any other suitable time period. Such packages may also include provisions for resolution of streaming of the videos 115, and the like. As will be described in more detail below, the computing device 101 generally initially selects one of the discrete selectable allocated resources 117, for example as a first reserved aggregate allocated resources, for a first given time period, which is generally based the actual allocated resources for the videos 115.

Depending on a "package" (e.g. one of the discrete selectable allocated resources 117) selected by the computing device 101, as well as packages (e.g. discrete selectable allocated resource 117) selected by other entities, which are also using the streaming system 103 to stream videos, the streaming system 103 may negotiate use of network resources for performing streaming of all videos of all such entities (e.g. including the videos 115), for example by a network provider.

However, when used resources for streaming the videos 115 exceed the discrete selectable allocated resources 117 selected by the computing device 101 as first reserved aggregate allocated resources, streaming of other videos (e.g. of other entities, which are also using the streaming system 103 to stream videos) may be impacted. As such, the streaming system 103 may respond in a manner that stops streaming of the videos 115 and/or reduces quality and/or resolution thereof and/or increases a cost to the computing device 101 for streaming the videos 115.

As such, the computing device 101 is generally configured to select another of the discrete selectable allocated resources 117, as second reserved aggregate allocated resources for a second given time period, based on monitoring the used resources for streaming the videos 115, and differences between the reserved allocated resources and the actual allocated resources for the videos 115, as described in more detail below, for example via a resource allocation engine 119.

Figure 2:
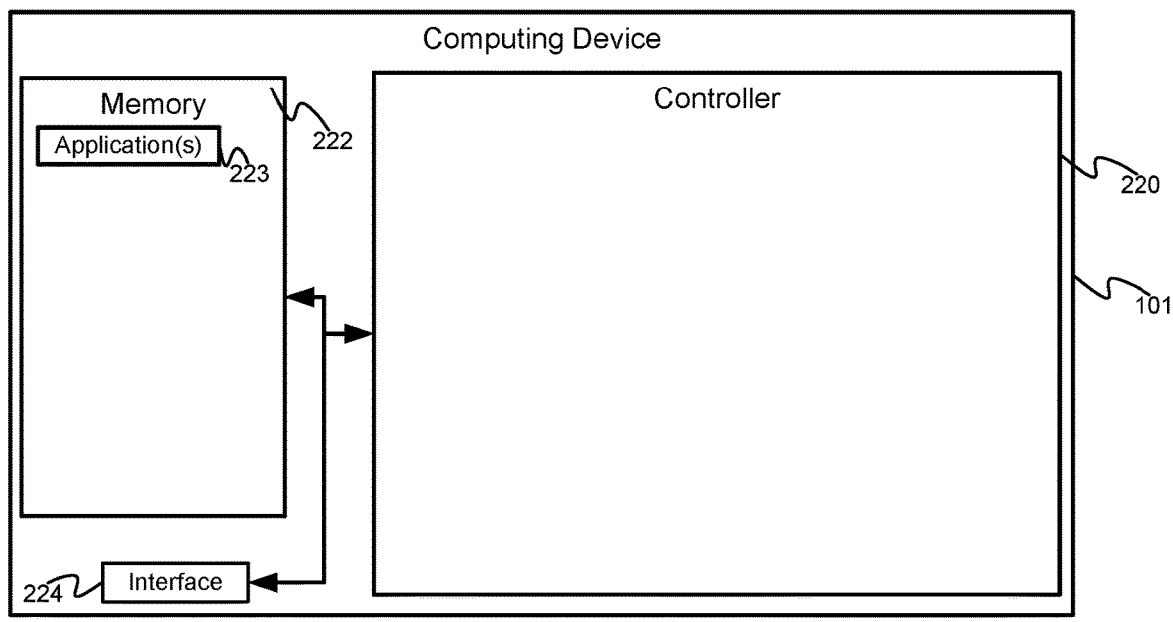
FIG. 2 depicts a block diagram of a computing device for allocating resources for video streaming, according to non-limiting examples.

Details of the computing device 101 are now described with respect to FIG. 2.

The computing device 101, can comprise any suitable computing device, including but not limited to one or more personal computers, laptops, servers, cloud computing devices, and the like. In some examples, where the computing device 101 may be used to generate videos 115 as a proxy client device 105, the computing device 101 include one or more of a graphics processing unit (GPU), a graphics processing device, a graphics processing engine, a video processing device, and the like.

As depicted, the computing device 101 generally comprises: a controller 220; a memory 222 storing one or more applications 223, and a communication interface 224 (interchangeably referred to hereafter as the interface 224). While the memory 222 is depicted as internal to the computing device 101, the memory 222 may be external to the computing device 101 and the controller 220 may have access to the memory 222 via the interface 224.

In general, while not depicted in FIG. 2, the resource allocation engine 119 may generally comprise a combination of the controller 220 and the memory 222 storing the application 223, and the interface 224.

Each of the one or more applications 223 may be similar, but for a different mode of the computing device 101; for example, in one mode, the computing device 101 may allocate resources, as described herein, while in another mode a machine learning algorithm may be trained to implement functionality as describe herein. For simplicity, the one or more applications 223 will be interchangeably referred to hereafter as the application 223.

While not depicted, the computing device 101 may include other suitable components, including, but not limited to, a display screen, an input device and the like, to enable an administrator to interact with the computing device 101; however, such an administrator may alternatively interact with the computing device 101 remotely via the interface 224.

The interface 224 comprises any suitable wired or wireless communication interface configured to communicate with the streaming system 103 (and/or the client devices 105). The interface 224 may communicate in a wired and/or wireless manner as desired including, but not limited using cables, Internet-based communication links, WiFi™ communication links, wide area networks, personal area networks, local area networks, and the like.

The controller 220 can comprise a processor and/or a plurality of processors, including but not limited to one or more central processors (CPUs) and/or one or more graphics processing units (GPUs) and/or one or more processing units; either way, the controller 220 comprises a hardware element and/or a hardware processor. In some implementations, the controller 220 can comprise an ASIC (application-specific integrated circuit) and/or an FPGA (field-programmable gate array) specifically configured for allocating resources for video streaming. Hence, the computing device 101 may preferably not be a generic computing device, but a device specifically configured to implement specific functionality for allocating resources for video streaming. For example, the computing device 101 and/or the controller 220 can specifically comprise a computer executable engine, such as the resource allocation engine 119, configured to implement functionality for allocating resources for video streaming.

The memory 222 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the computing device 101 as described herein are typically maintained, persistently, in the memory 222 and used by the controller 220, which makes appropriate utilization of volatile storage during the execution of such programming instructions. Those skilled in the art recognize that the memory 222 is an example of computer readable media that can store programming instructions executable on the controller 220. Furthermore, the memory 222 is also an example of a memory unit and/or memory module and/or a non-volatile memory.

In particular, the memory 222 stores the application 223 that, when processed by the controller 220, enables the controller 220 and/or the computing device 101 to: determine respective differences between reserved allocated resources and actual allocated resources for videos provided to a streaming system by client devices; select, at the streaming system, first reserved aggregate allocated resources, from a plurality of discrete selectable allocated resources available at the streaming system, the first reserved aggregate allocated resources selected based on the actual allocated resources for videos, the first reserved aggregate allocated resources for streaming the videos to video-playing devices; monitor used resources for streaming the videos to the video-playing devices from the streaming system; and in response to determining that the used resources are within a threshold value of the first reserved aggregate allocated resources: select second reserved aggregate allocated resources, from the plurality of discrete selectable allocated resources, for streaming the videos to the video-playing devices, the second reserved aggregate allocated resources selected based on the respective differences between the reserved allocated resources and the actual allocated resources for the videos.

The application 223, and/or the resource allocation engine 119, may include numerical algorithms configured to implement the functionality as described above and/or to generate estimates of respective resources to be used to stream the videos 115, from the streaming system 103, in respective time periods, for example to assist in selecting the first reserved aggregate resources and the second reserved aggregate resources.

Alternatively, and/or in addition to numerical algorithms, the application 223, and/or the resource allocation engine 119, may include machine learning models and/or algorithms, and the like, which have been trained to implement the functionality as described above and/or trained to generate estimates of respective resources to be used to stream the videos 115, from the streaming system 103, in respective time periods, for example to assist in selecting the first reserved aggregate resources and the second reserved aggregate resources, and/or any other suitable functionality of the computing device 101. The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, in examples where the application 223 includes machine learning models and/or algorithms, and the like, the application 223 may include a machine learning training module, and the like, in which the computing device 101 receives input corresponding resources used at the streaming system 103 to stream the videos 115 (e.g. in a given time period), as well as any other suitable parameters (e.g. numbers of the videos 115, types of the video-playing devices 107, regions into which the videos 115 are streamed, and the like).

While details of the streaming system 103, and the devices 105, 107 are not depicted, the streaming system 103, and the devices 105, 107 may have structure similar to the computing device 101, but adapted for their respective functionality and/or including various respective components for implementing such functionality. For example, the client devices 105 and the video-playing devices 107 may generally include display screens and input devices, and the like.

Figure 3:
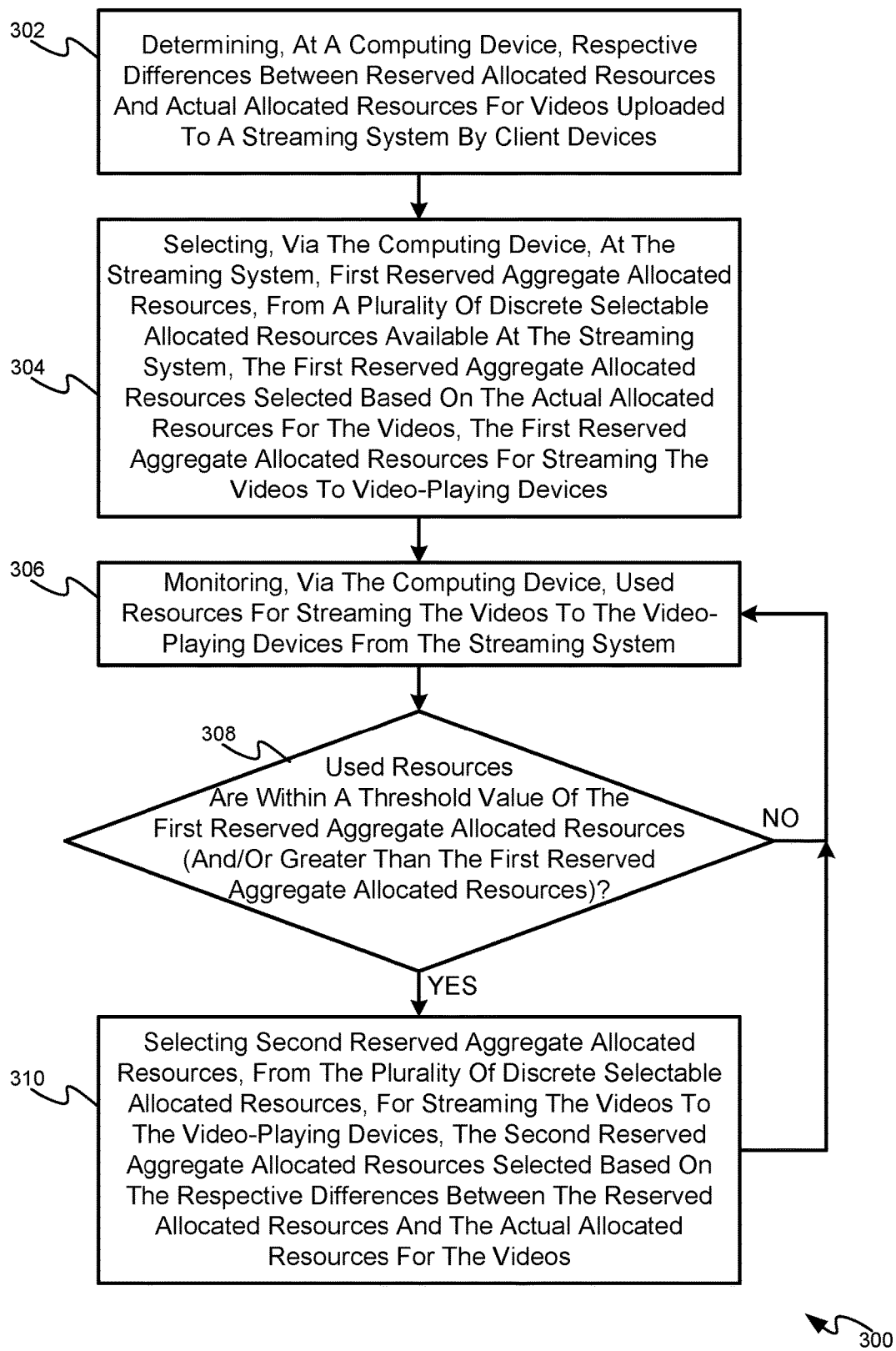
FIG. 3 depicts a method for allocating resources for video streaming, and according to non-limiting examples.

Attention is now directed to FIG. 3, which depicts a flowchart of a method 300 for allocating resources for video streaming according to non-limiting examples. The operations of the method 300 may correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 4 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100, as well.

At a block 302, the controller 220 and/or the computing device 101 determines respective differences between reserved allocated resources and actual allocated resources for the videos 115 provided to the streaming system 103 by the client devices 105.

For example, as described above, a client device 105 may provide a video 115 to the streaming system 103 and the computing device 101 may determine that the client device 105 selects reserved allocated resources for the video 115; for example, the client device 105 may select a given length and/or size of a video, from a plurality of available given lengths and/or given sizes, but the video 115 provided may be less than a selected given length and/or given size, thereby causing the computing device 101 to store, at a memory (e.g. the memory 222 or another suitable memory), the selected given length and/or given size and the actual length and/or given size, and determine the difference therebetween, which is also stored at the memory. For simplicity, storage of such various items by the computing device 101 will be described with respect to the memory 222, however it is understood that the computing device 101 may store such items (e.g. values for the reserved allocated resources, actual allocated resources and a difference therebetween) at any suitable memory.

Regardless, when storing such items, the computing device 101 causes the memory 222 (and the like) to undergo a tangible physical change. Indeed, storage of any items at the memory 222 (and the like), as described herein, causes the memory 222 to undergo a tangible physical change.

As mentioned above, reserved allocated resources for a video 115 may comprise a reserved length of the video 115, and actual allocated resources for the video 115 may comprise an actual length of the video 115. Hence, a difference therebetween may correspond to a difference in the reserved length and the actual length. However, while the reserved and actual allocated resources has heretofore been described with respect to length of videos 115, the reserved and actual allocated resources may be in any suitable format including, but not limited to, a size of the video 115 (e.g. as indicated by numbers of bits and/or bytes of a video 115), with a difference therebetween in a similar and/or same format.

Put another way, each of the reserved allocated resources (e.g. for the videos 115) may be selected from a plurality of discrete reserved allocated resources (e.g. the above described plurality of available given lengths, and the like).

Indeed, the videos 115 may also be limited, by the computing device 101, and/or the site engine 109, to a given highest resolution (e.g. 720p and/or any other suitable resolution) and/or a converted to a given resolution, to prevent a client device 105 from selecting, for example, a given length of a video, but uploading a very high resolution video 115 (e.g. 8K), which would increase later usage of streaming resources. Such a limitation of resolution may also occur due to a package selected by the computing device 101 at the streaming system 103 that limits videos to be streamed to a given resolution. Such limits on resolution, and the like, may also be incorporated into the reserved allocated resources and actual allocated resources (e.g. selected lengths and actual lengths of videos 115 may be for a given resolution and/or smaller than such a given resolution).

Furthermore, when a video 115 is provided (e.g. uploaded to the site engine 109), the controller 220 and/or the computing device 101 (and/or the site engine 109) may check the actual allocated resources of the video 115 against the reserved allocated resources to ensure that that the actual allocated resources of the video 115 does not exceed the reserved allocated resources. For example, when a client device 105 selects reserved allocated resources corresponding to 10 seconds for a video 115, the controller 220 and/or the computing device 101 (and/or the site engine 109) checks the length of the video 115 to ensure the video 115 does not exceed 10 seconds. Similar checks on resolution of the video 115 may also occur. When the actual allocated resources of the video 115 is greater than the reserved allocated resources, the controller 220 and/or the computing device 101 (and/or the site engine 109) may instruct a client device 105 to again select reserved allocated resources that is greater than, or equal to, the actual allocated resources of the video 115, and/or upload another video 115 that is less then, or equal to, initially selected reserved allocated resources.

Regardless, it is understood that actual allocated resources of a video 115 are limited by the computing device 101 to being less than reserved (e.g. selected) allocated resources.

It is yet further understood that the controller 220 and/or the computing device 101 determines a difference between reserved allocated resources and actual allocated resources for all the videos 115, and that the reserved allocated resources may be different for two or more of the videos 115, and furthermore the difference between reserved allocated resources and actual allocated resources may be may be different for two or more of the videos 115. Put another way, different videos 115 where 10 seconds may be reserved therefor may be of different lengths (e.g. videos 115 of 6 seconds, 7 seconds, 7.8 seconds, etc. may be provided, and/or any length up to 10 seconds).

At the block 302, the controller 220 and/or the computing device 101 may further determine a total of the differences between the reserved allocated resources and the actual allocated resources for the videos 115. At the block 302, the controller 220 and/or the computing device 101 may further determine a total of the reserved allocated resources and a total of the actual allocated resources.

At a block 304, the controller 220 and/or the computing device 101 selects, at the streaming system 103, first reserved aggregate allocated resources 117, from the plurality of discrete selectable allocated resources 117 available at the streaming system 103, the first reserved aggregate allocated resources 117 selected based on the actual allocated resources for the videos 115, the first reserved aggregate allocated resources 117 for streaming the videos 115 to video-playing devices 107, for example in a first time period.

For example, the controller 220 and/or the computing device 101 may determine an aggregate length and/or size (e.g. in bits, bytes, and the like) of the actual allocated resources for the videos 115, and estimate a number of streams per given time period of the videos 115. Such an estimate may initially be based on numbers of known video-playing devices 107 to which the videos 115 may be pushed; for example, entities operating video display devices and/or electronic billboard and/or video kiosks may cooperate with the entity operating the computing device 101 to arrange for streaming of the videos 115 to the video display devices (e.g. and which may be based on regional locations of the video display devices), and/or the entity operating the computing device 101 may operate such video display devices. Such an estimate may be alternatively be based on a number of times an application for receiving the videos 115 (e.g. which may be provided by the entity operating the computing device 101) has been downloaded to mobile devices, and the like. Such an estimate may be alternatively be based on a number of times a website for receiving the videos 115 has been accessed, and the like. However, such an estimate may be based on any suitable combination of such factors and/or other factors and/or provided via a machine learning algorithm, and the like.

With an estimate of resources to be used to stream the videos 115 for a given time period (e.g. the first given time period for first reserved aggregate allocated resources 117), the controller 220 and/or the computing device 101 selects, at the streaming system 103, first reserved aggregate allocated resources 117, from the plurality of discrete selectable allocated resources 117 based on the actual allocated resources for the videos 115. For example, an estimate of a number of times that the videos 115 may be streamed may be multiplied by the total of the actual allocated resources for the videos 115, and a closest one of the discrete selectable allocated resources 117, that is also greater than the total of the actual allocated resources for the videos 115, may be selected, by the controller 220 and/or the computing device 101, as the first reserved aggregate allocated resources 117.

The selection of the first reserved aggregate allocated resources 117 may further be based on a factor to account for error and/or variation in the estimates, such as 10%, and/or any other suitable factor (e.g. 5%, 15%, etc.), which may be predetermined and provisioned at the computing device 101 (e.g. in the application 223) by an administrator of the computing device 101, and/or dynamically determined using machine learning algorithms, and the like. For example, the estimate of a number of times that the videos 115 may be streamed, multiplied by the total of the actual allocated resources for the videos 115, may be further increased by the factor.

In yet further examples, a plurality of estimates of a number of respective times that respective videos 115 may be streamed may be determined on a regional basis, based on locations of the video-playing devices 107 as described above, and the selection of the first reserved aggregate allocated resources 117 may be based on a total of such regional estimates. For example, actual allocated resources for the videos 115 for a first region may be multiplied by a first estimate of streams to video-playing devices 107 associated with the first region, and added to actual allocated resources for the videos 115 for a second region multiplied by a second estimate of streams to video-playing devices 107 associated with the second region; such estimates may occur for any suitable number of regions.

It is yet further understood that selection of the first reserved aggregate allocated resources 117 may be selected for a first given time period, for example a month, and the like.

Furthermore, the controller 220 and/or the computing device 101 may store an indication of the first reserved aggregate allocated resources 117, for example at the memory 222.

Thereafter, the videos 115 may be available for streaming from the streaming system 103, via the video streaming engine 113, and the streaming system 103 provides the videos 115 to the video-playing devices 107, as described above.

At a block 306, the controller 220 and/or the computing device 101 monitors used resources for streaming the videos 115 to the video-playing devices 107 from the streaming system 103. For example, the streaming system 103 may provide data, reports, messages, and the like, to the controller 220 and/or the computing device 101, indicative of the resources used by the streaming system 103 to stream the videos 115. Such data, and the like, may indicate a number of minutes and/or bits and/or bytes of the videos 115 streamed in a given time period, which may be the same as, or less than the first given time period for which the first reserved aggregate allocated resources 117 were selected. For example, the streaming system 103 may provide such data periodically, for example, on an hourly basis, a weekly basis, a monthly basis and/or according to any other suitable time period and/or periodicity. Such data may further indicate regional streaming of the videos 115 and/or respective numbers of times individual videos 115 were streamed, and/or to which regions. Such data may alternatively be requested by the computing device 101.

Furthermore, the data, and the like, may be provided as any suitable combination of parameters, which indicate resources used to stream the videos 115 including, but not limited to, an amount of bandwidth used to stream the videos 115, seconds and/or minutes streamed, an amount of bits and/or bytes streamed, and the like. Furthermore, the data may be provided in any suitable format including, but not limited to, in a message (e.g. an email, and the like), a report, a databased and/or tabular format, and the like.

In some examples, the streaming system 103 may provide such data to the controller 220 and/or the computing device 101 upon request by the controller 220 and/or the computing device 101.

Regardless, the data enables the controller 220 and/or the computing device 101 to determine actual used resources for streaming the videos 115, which may be compared to the selected first reserved aggregate allocated resources 117.

At a block 308, the controller 220 and/or the computing device 101 determines whether the used resources are within a threshold value of the first reserved aggregate allocated resource 117. Such a determination may occur within a given time before an end of the first time period associated with the selected first reserved aggregate allocated resources 117 (e.g. to ensure that if the used resources are within a threshold value of the first reserved aggregate allocated resource 117, reserved aggregate allocated resources 117 are selected before a next time period commences, as described hereafter).

Such a threshold value may comprise any suitable threshold value, such as 10% of the first reserved aggregate allocated resource 117, and/or any other suitable threshold value (e.g. 5%, 15%, etc.), which may be predetermined and provisioned at the computing device 101 (e.g. in the application 223) by an administrator of the computing device 101, and/or dynamically determined using machine learning algorithms, and the like.

In some examples, the threshold value may be based on an intermediate determination of the used resources (e.g. which may be determined from periodic receipt of the used resources at the computing device 101, prior to an end of the first given time period for which the first reserved aggregate allocated resources 117 were selected. In particular, the controller 220 and/or the computing device 101 may determine a rate of change of the used resources and adjust the threshold value accordingly. For example, initially a threshold value of 10% may be selected, and, as a rate of change of the used resources increases or decreases, the threshold value may be increased or decreased from 10%.

In general, the threshold value is used to determine whether or not to select another of the plurality of discrete selectable allocated resources 117, which is greater than the first reserved aggregate allocated resources 117, for a next given time period. When the used resources are not within the threshold value of the first reserved aggregate allocated resources 117, in some examples, the first reserved aggregate allocated resources 117 may be maintained for a next time period (e.g. a next month). However, when the used resources are not the threshold value of the first reserved aggregate allocated resources 117, a second reserved aggregate allocated resources 117 may be selected from the plurality of discrete selectable allocated resources 117.

Hence, when a rate of change of the used resources is increasing, the threshold value may be increased to sooner change the selection of the plurality of discrete selectable allocated resources 117; however, when the rate of change of the used resources is decreasing, the threshold value may be decreased to later change the selection of the plurality of discrete selectable allocated resources 117.

At the block 308, the controller 220 and/or the computing device 101 may further determine whether, or not, the used resources are greater than the first reserved aggregate allocated resources 117, which may automatically trigger selection of second reserved aggregate allocated resources 117 (e.g. greater than the first reserved aggregate allocated resources 117) for a next time period (e.g. a next month).

In response to determining, at the block 308, that the used resources are within a threshold value of the first reserved aggregate allocated resources (e.g. a "YES" decision at the block 308), at a block 310 the controller 220 and/or the computing device 101 selects second reserved aggregate allocated resources 117, from the plurality of discrete selectable allocated resources 117, for streaming the videos 115 to the video-playing devices 107. In general, the second reserved aggregate allocated resources 117 may be selected based on the respective differences between the reserved allocated resources and the actual allocated resources for the videos 115 as described above. Such a selection of second reserved aggregate allocated resources 117 may also occur when the used resources are greater than the first reserved aggregate allocated resources 117 (e.g. which also leads to a "YES" decision at the block 308).

In particular, the second reserved aggregate allocated resources 117 is selected to be greater than the used resources. However, the second reserved aggregate allocated resources 117 is further selected to be greater than total actual allocated resources for the videos 115 (e.g. multiplied by an updated estimate for streaming the videos 115), further taking into account the respective differences between the reserved allocated resources and the actual allocated resources for the videos 115 and, in particular, the total differences between the reserved allocated resources and the actual allocated resources for the videos 115.

For example, the second reserved aggregate allocated resources 117 may be selected to be greater than total actual allocated resources for the videos 115 (e.g. multiplied by an updated estimate for streaming the videos 115), but less than total reserved allocated resources for the videos 115 (e.g. multiplied by the updated estimate for streaming the videos 115).

The updated estimates referred to above may be for a next time period, and/or a second time period for which the second reserved aggregate allocated resources 117 is selected (e.g. the second time period following the first time period for which the first reserved aggregate allocated resources 117 was selected), and may be based on demand for the videos 115 in the first time period and/or historical demand for the videos 115, which may be represented by the aforementioned used resources.

Hence, in general, the first reserved aggregate resources 117 and the second reserved aggregate resources 117 may be further selected based on respective estimates of respective resources to be used to stream the videos 115, from the streaming system 103, in respective time periods.

Furthermore, in general, the first reserved aggregate allocated resources 117 are selected for a first time period, and the second reserved aggregate allocated resources 117 are selected for a second time period following the first time period. The time periods may, however, be any suitable length. For example, the controller 220 and/or the computing device 101 may determine that the used resources are not within the threshold value of the first reserved aggregate allocated resources (e.g. a "NO" decision at the block 308) for consecutives months such that the first reserved aggregate allocated resources 117 does not change for such consecutive months. However, in a last of such consecutive months, the controller 220 and/or the computing device 101 may determine that the used resources are within the threshold value of the first reserved aggregate allocated resources 117 (e.g. a "YES" decision at the block 308) for consecutives months such that the second reserved aggregate allocated resources 117 is selected for a next month following the consecutive months. Put another way, the respective time periods associated with first and second reserved aggregate allocated resources 117 may be any suitable time periods.

In general, the total of the respective differences (e.g. multiplied by an updated estimate for streaming the videos 115) between the reserved allocated resources and the actual allocated resources for the videos 115 may added to the total actual allocated resources for the videos 115 (e.g. multiplied by the updated estimate for streaming the videos 115) and the second reserved aggregate allocated resources 117 may be selected to be greater than total actual allocated resources for the videos 115 (e.g. multiplied by an updated estimate for streaming the videos 115) but less than the total actual allocated resources for the videos 115 with the total respective differences added thereto (e.g. both multiplied by an updated estimate for streaming the videos 115).

Hence, the respective differences may be used to cap selection of the second reserved aggregate allocated resources 117.

For example, the total actual allocated resources for the videos 115 with the total respective differences added thereto, may be determined to represent a demand for the videos 115 (e.g. by the video-playing devices 107), which is "too high" such that the streaming service 103 may not effectively stream the videos 115 and/or at which (and/or above which), the computing device 101 (and/or an entity operating the computing device 101) may not be able to effectively manage streaming of the videos 115. In particular, while the video streaming engine 113 may be dynamically scaled to meet demand for the videos 115, the streaming service 103 may penalize streaming of the videos 115 based on the demand, as described above, leading to lower quality streaming, higher costs to the computing device 101, and the like. The total actual allocated resources for the videos 115 with the total respective differences added thereto may represent a demand above which quality of the streaming decreasing, and/or some associated cost, is unacceptable for the computing device 101. While the term "unacceptable" is understood to be a relative term, the total actual allocated resources for the videos 115 with the total respective differences added thereto is further understood to represent an unambiguous representation of such unacceptability, and the like.

In yet further examples, the total actual allocated resources for the videos 115 with the total respective differences added thereto may be adjusted to a capped amount and/or capped to capped allocated resources (e.g. which may be based on a predetermined capping factor, such as 10% less than the total actual allocated resources for the videos 115 with the total respective differences added thereto and/or any other suitable value). Such a capped amount (and/or capped allocated resources) may also represent an amount above which demand for the videos 115 may be determined to be unacceptable, with the total respective differences added thereto, and adjusted by the predetermined capping factor, is understood to represent an unambiguous representation of such unacceptability.

In yet further examples, the capped allocated resources may be set to the total actual allocated resources for the videos 115 with the total respective differences added thereto (e.g. the predetermined capping factor may be set to "0").

It is hence understood that the first reserved aggregate resources 117 is also less than the capped amount.

Put another way, the method 300 may further comprise the controller 220 and/or the computing device 101 determining capped allocated resources, and the first reserved aggregate resources 117 and the second reserved aggregate resources 117 are selected to be less than the capped allocated resources, the capped allocated resources determined from the actual allocated resources and the respective differences between the reserved allocated resources and the actual allocated resources, adjusted by a predetermined capping factor.

Regardless, when the second reserved aggregate resources 117 are selected, the videos 115 remain available for streaming from the streaming system 103, via the video streaming engine 113, and the streaming system 103 provides the videos 115 to the video-playing devices 107, as described above. Indeed, selection of the second reserved aggregate resources 117, in place of the second reserved aggregate resources 117, may occur without interruption of streaming of the videos 115.

Returning briefly to the block 308, in response to determining that the used resources are not within a threshold value of the first reserved aggregate allocated resources but are not greater than the first reserved aggregate allocated resources, (e.g. a "NO" decision at the block 308), at a block 310, the controller 220 and/or the computing device 101 continues to monitor the used resources at the block 306. Alternatively, and/or periodically, the controller 220 and/or the computing device 101 may again implement the blocks 302, 304, etc. in the event a number of the videos 115 change and/or changes occur to the respective differences between reserved allocated resources and actual allocated resources for the videos 115, for example to again select a reserved aggregate allocated resources 117, from the plurality of discrete selectable allocated resources 117 at the block 306.

In some examples, the used resources, for example determined at the block 306, may be less than the first reserved aggregate allocated resources 117 and also less than that a given one of the of the plurality of discrete selectable allocated resources 117, that is also less than the first reserved aggregate allocated resources 117. Put another way, in some examples, the resources used to stream the videos 115 may have been overestimated during selection of the first reserved aggregate allocated resources 117, such that the used resources are not only less than the first reserved aggregate allocated resources 117, but are also lower than another one of the plurality of discrete selectable allocated resources 117 that is less than the first reserved aggregate allocated resources 117. In these examples, the method 300 may further comprise, the controller 220 and/or the computing device 101: in response to determining that the used resources are below a given one of the plurality of discrete selectable allocated resources 117, the given one of the plurality of discrete selectable allocated resources 117 below the first reserved aggregate allocated resources 117: selecting the given one of the plurality of discrete selectable allocated resources 117 for streaming the videos 115 to the video-playing devices 107. In other words, a given one of the plurality of discrete selectable allocated resources 117 is selected that is greater than, but closest to, the used resources and/or an estimate of the resources to be used in a next time period as determined from then used resources.

In yet further examples, one or more of the first reserved aggregate allocated resources 117 and the second reserved aggregate allocated resources 117 and the used resources may exceed the capped allocated resources described above. In these examples, as the capped allocated resources may represent an amount above which demand for the videos 115 may be determined to be unacceptable, the controller 220 and/or the computing device 101 may communicate with the client devices 105 to negotiate changes to one or more of the reserved allocated resources and the actual allocated resources, for example to negotiate streaming of lower quality versions of the videos 115 (e.g. to lower actual allocated resources), negotiate different lengths of the videos, negotiate an updated cost for streaming the videos 115 (e.g. based on increased demand), and the like. In these examples, the method 300 may further comprise, the controller 220 and/or the computing device 101: in response to determining that one or more of the first reserved aggregate allocated resources 117, the second reserved aggregate allocated resources 117 and the used resources exceeds capped allocated resources: communicating with the client devices 105 to negotiate changes to one or more of the reserved allocated resources and the actual allocated resources. Once the negotiation of the changes occurs, the controller 220 and/or the computing device 101 may select one of the plurality of discrete selectable allocated resources 117 in accordance with the negotiated changes.

The method 300 is next described with respect to FIG. 4, FIG. 5, FIG. 6 FIG. 7 and FIG. 8, which depict the computing device 101 and/or the system 100 and/or portions of the system 100, with like components having like numbers. When the computing device 101 and/or a portion of the system 100 is depicted in FIG. 4, FIG. 5, FIG. 6 FIG. 7 and FIG. 8, it is understood that the remaining components of the system 100 are also present. Furthermore, while not always depicted, the example depicted in FIG. 4, FIG. 5, FIG. 6 FIG. 7 and FIG. 8 may be at least partially implemented by the resource allocation engine 119.

Figure 4:
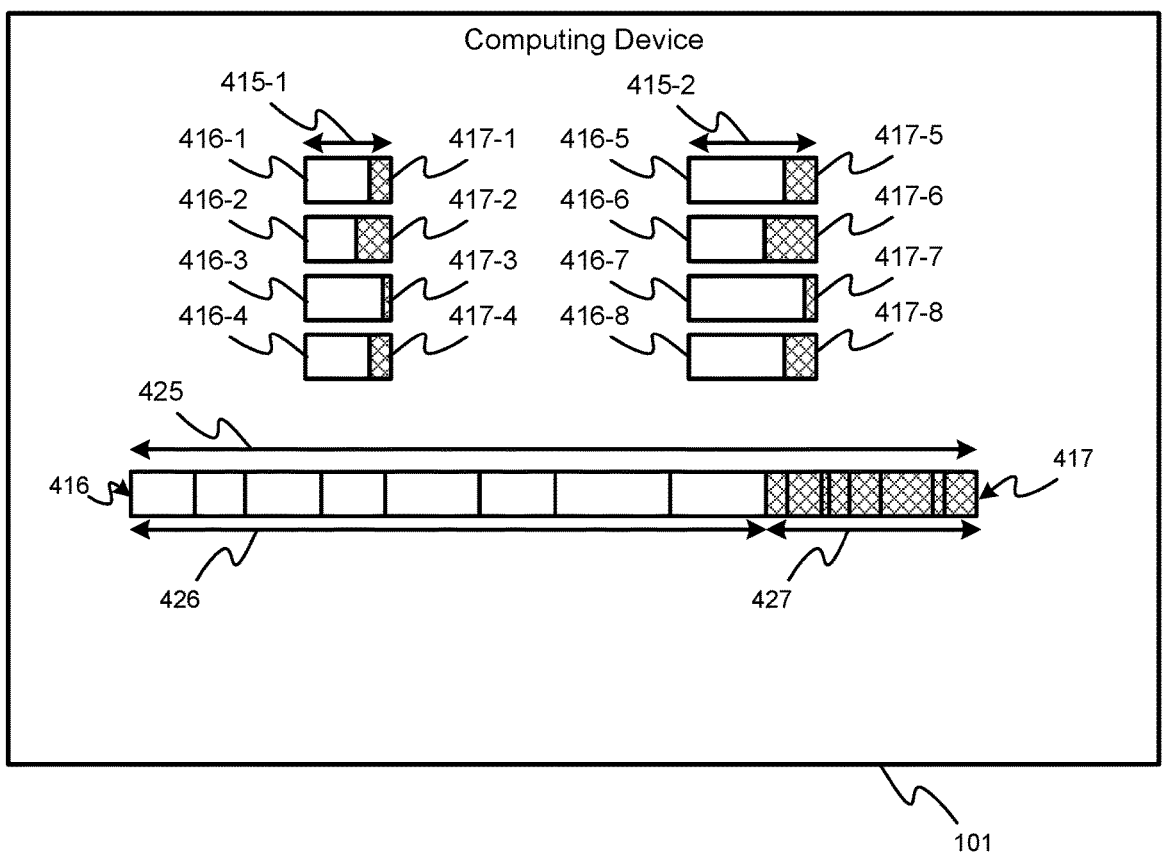
FIG. 4 depicts an example of a method for allocating resources for video streaming being implemented in components of the system of FIG. 1, and according to non-limiting examples.

Attention is next directed to FIG. 4, which depicts the computing device 101 determining (e.g. at the block 302 of the method 300) respective differences between reserved allocated resources and actual allocated resources for eight videos 115 provided to the streaming system 103 by the client devices 105. For simplicity and/or clarity, such a determination is represented graphically (e.g. with reserved allocated resources represented as arrows, and actual allocated resources and differences therebetween represented as boxes, with horizontal lengths thereof representing a size of allocated resources and/or a length and/or size of the videos 115, and the like), however the determination may generally be performed numerically.

While the eight videos 115 are not depicted, it is understood that: four of the videos 115 have reserved allocated resources 415-1, corresponding to a first length (e.g. of the arrow indicating the reserved allocated resources 415-1), and selected from a plurality of discrete reserved allocated resources as described above; and another four of the videos 115 have reserved allocated resources 415-2, corresponding to a second length (e.g. of the arrow indicating the reserved allocated resources 415-2) greater than the first length, and selected from the plurality of discrete reserved allocated resources as described above. For example, the arrow representing the reserved allocated resources 415-2 is longer than the arrow representing the reserved allocated resources 415-1.

As mentioned above, the reserved allocated resources 415-1, 415-2 (e.g. reserved allocated resources 415) are depicted as arrows with a horizontal length thereof representing a size and/or length of the respective videos 115. Hence, for example, the reserved allocated resources 415-1 may represent 10 seconds, and the like, reserved for four videos 115 (e.g. a reserved length), and the reserved allocated resources 415-2 may represent 20 seconds, and the like, reserved for the other four videos 115. However, as described, the videos 115 may be less than the respective reserved allocated resources 415 and/or less than the respective reserved lengths.

Under each of the reserved allocated resources 415 are four boxes that correspond to the eight example videos 115 (four for the respective reserved allocated resources 415-1 and another four for the respective reserved allocated resources 415-2). A "white" portion of each box under the reserved allocated resources 415 corresponds to respective actual allocated resources 416-1, 416-2, 416-3, 416-4, 416-5, 416-6, 416-7, 416-8 (e.g. actual allocated resources 416) of the eight videos 115, with a total horizontal length of each box being the same length as respective reserved allocated resources 415, and a respective horizontal length of actual allocated resources 416 corresponding to the actual size (e.g. length) of the respective videos 115. Hence, a "shaded" portion of each box, extending past the actual allocated resources 416, corresponds to a respective difference 417-1, 417-2, 417-3, 417-4, 417-5, 417-6, 417-7, 417-8 (e.g. the differences 417 and/or a difference 417) between the reserved allocated resources 415 and the actual allocated resources 416.

In particular, the actual allocated resources 416-1, 416-2, 416-3, 416-4 and the respective differences 417-1, 417-2, 417-3, 417-4 are for four videos 115, which have a reserved allocated resource 415-1 (e.g. of 10 seconds, and the like);

and the actual allocated resources 416-5, 416-6, 416-7, 416-8 and the respective difference 417-5, 417-6, 417-7, 417-8 are for four videos 115, which have a reserved allocated resource 415-2 (e.g. of 20 seconds, and the like).

Also depicted in FIG. 4, the computing device 101 determines total reserved allocated resources 425 (e.g. a sum of the total lengths of the actual allocated resources 416 and the differences 417, and/or four times the length of the reserved allocated resources 415-1 plus four times the length of the reserved allocated resources 415-2).

Similarly, the computing device 101 determines total actual allocated resources 426 (e.g. a sum of the actual allocated resources 416) and total differences 427 (e.g. a sum of the differences 417). As graphically depicted, the length of the total actual allocated resources 426 corresponds to a sum of the lengths of the actual allocated resources 416, and the length of the total differences 427 corresponds to a sum of the lengths of the differences 417.

Attention is next directed to FIG. 5, which depicts the computing device 101 selecting (e.g. at the block 304 of the method 300) first reserved aggregate allocated resources 117-1, from a plurality of discrete selectable allocated resources 117, available at the streaming system 103. As depicted, the plurality of discrete selectable allocated resources 117 comprises four discrete selectable allocated resources 117-0, 117-1, 117-2, 117-3, depicted graphically, with a respective length thereof indicating a respective size thereof. Numbering of the plurality of discrete selectable allocated resources 117 begins at "0" to illustrate that while reserved aggregate allocated resources 117-1 may be selected, as described hereafter, one or more of the plurality of discrete selectable allocated resources 117 may be less than the first reserved aggregate allocated resources 117-1.

As depicted, the four discrete selectable allocated resources 117 are depicted as aligned at a left end to show the relative sized thereof at respective right ends, and also relative to the total actual allocated resources 426 with, and without the total differences 427 added thereto (e.g. which are depicted laid out linearly with a left end thereof aligned with the left ends of the four discrete selectable allocated resources 117).

Furthermore, the total actual allocated resources 426 and the total differences 427 have been multiplied by an estimated number of streams of the respective eight videos 115 in a given time period. For example, the computing device 101 may initially estimate only two streams per month for the respective eight videos 115. While such an estimate is understood to be small compared to actual estimates of numbers of streams (e.g. when the system 100 is deployed in the field, the number of streams may be in the hundreds to thousands or higher), the estimate of two streams per month for the respective eight videos 115 is merely provided as an example to easily illustrate implementation of the method 300.

Hence, continuing with the example estimate of two streams per month, the total actual allocated resources 426 and the total differences 427 are graphically depicted twice (e.g. and shown end-to-end) such that the length of twice the total actual allocated resources 426 represents an estimate of the resources to be used by the streaming system 103 to stream the videos 115 in a given time period. The lengths of the four discrete selectable allocated resources 117, relative to twice the total actual allocated resources 426, with twice the total differences 427 added thereto, is emphasized via dotted lines extending from the discrete selectable allocated resources 117.

As depicted, twice the total actual allocated resources 426 is greater than the discrete selectable allocated resources 117-0, but less than the discrete selectable allocated resources 117-1. As such, the computing device 101 selects the first reserved aggregate allocated resources 117-1 (e.g. represented by "Selected" on the first reserved aggregate allocated resources 117-1).

Hence, the first reserved aggregate allocated resources 117-1 is selected based on the actual allocated resources 416 for the videos 115.

While the four discrete selectable allocated resources 117 are depicted graphically at the computing device 101, it is understood that values for the four discrete selectable allocated resources 117 may be retrieved from the streaming system 103 by the computing device and numerically compared to the actual allocated resources 416 (e.g. multiplied by an estimate of numbers of streams per month, and the like, to compare to the total actual allocated resources 426).

Regardless, as depicted in FIG. 6, the computing device 101 may transmit a communication 601 to the streaming system 103 indicating a selection of the first reserved aggregate allocated resources 117-1. Thereafter, as also depicted in FIG. 6, the streaming system 103 may stream the videos 115 to the video-playing devices 107. Continuing with the example of FIG. 4 and FIG. 5, in the example depicted in FIG. 6, it is understood that there may be eight (e.g. Q=8) videos 115 and four (e.g. R=4) discrete selectable allocated resources 117.

As also depicted in FIG. 6, the streaming system 103 transmits and/or provides an indication 603 of used resources to the computing device 101, as described above. In particular, as depicted, by receiving the indication 603, the computing device 101 monitors (e.g. at the block 306 of the method 300) the used resources for streaming the videos 115 to the video-playing devices 107. For example, the indication 603 of the used resources may represent a number of seconds of the streamed videos 115 in a given time period, a number of streamed bits and/or bytes, and the like.

Attention is next directed to FIG. 7, which depicts the computing device 101 comparing a value of the used resources 701 to the first reserved aggregate allocated resources 117-1 (e.g. a value of the used resources 701 determined via the indication 603). As in FIG. 4 and FIG. 5 the used resources 701 are depicted graphically, relative to the first reserved aggregate allocated resources 117-1, with their left ends aligned. A threshold value 703 is depicted as a shaded box extending rightwards from the left end of the first reserved aggregate allocated resources 117-1.

As also seen in FIG. 7, a length of the used resources 701 within the region of the threshold value 703 and hence, the computing device 101 determines (e.g. a "YES" decision at the block 308 of the method 300), that the used resources 701 are within the threshold value 703 of the first reserved aggregate allocated resources 117-1.

With respect to FIG. 8, as the computing device 101 that the used resources 701 are within the threshold value 703 of the first reserved aggregate allocated resources 117-1, the computing device 101 selects (e.g. at the block 310 of the method 300) second reserved aggregate allocated resources 117-2, from the plurality of discrete selectable allocated resources 117, for streaming the videos 115 to the video-playing devices 107.

As depicted, computing device 101 selects the second reserved aggregate allocated resources 117-2 based on the respective differences 417 and, in particular the total differences 427. For example, as in FIG. 4, the computing device 101 compares the total actual allocated resources 426 (e.g.

again using an estimate of two streams per month, but which may be adjusted based on the used resources 701) with the plurality of discrete selectable allocated resources 117, but now taking into account the total differences 427.

As depicted, the total differences 427, added to the total actual allocated resources 426 are larger than the second discrete selectable allocated resources 117-2, but less than the third discrete selectable allocated resources 117-3. However, the third discrete selectable allocated resources 117-3 may represented allocated resources that are too high as they exceed the total differences 427, added to the total actual allocated resources 426. Hence, rather than select the third discrete selectable allocated resources 117-3, the computing device 101 selects the second discrete selectable allocated resources 117-2 as the second reserved aggregate allocated resources 117-2 to be used for the next time period.

Also depicted in FIG. 8 is a capped allocated resources 801, as described above, which is less than the second discrete selectable allocated resources 117-2 (but greater than the first discrete selectable allocated resources 117-1); as such, the computing device 101 may alternatively select the second discrete selectable allocated resources 117-2 as the second reserved aggregate allocated resources 117-2 to be used for the next time period on the basis of the capped allocated resources 801.

Regardless, upon selection of the second reserved aggregate allocated resources 117-2, the computing device 101 communicates with the streaming system 103, similar to as depicted in FIG. 6, to control streaming of the videos 115 according to the second reserved aggregate allocated resources 117-2. Such selection has a tangible physical effect in the system 100, as such a selection may generally prevent the streaming system 103 from reducing resolution of the videos 115, increasing cost for streaming of the videos 115 (e.g. other than any increased cost for selection of the second reserved aggregate allocated resources 117-2 vs. the first reserved aggregate allocated resources 117-1), and the like.

Hence, in general, provided herein is a device, system and method for allocating resources for video streaming, which may be used to select reserved aggregate allocated resources for streaming to prevent reduction in quality of streaming of videos by a streaming system, and the like.

As should be apparent from the present specification, the functionality of computing devices described herein are sufficiently complex as to require their implementation on such computing devices and/or computing systems, and cannot, as a practical matter, be performed in the human mind. In particular, computing devices described herein are understood to include electronic components, which provide speed, accuracy and complexity management that are not obtainable by human mental steps, in addition to the inherently digital nature of such operations. For example, a human mind cannot interface directly with computer memory, digital storage, and the like. Similarly, a human mind cannot transmit and/or receive electronic messages, electronically encoded video, electronically encoded audio, etc., among other features and functions set forth herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
   determining, at a computing device, respective differences between reserved allocated bandwidth and actual allocated bandwidth for respective videos provided to a streaming system by client devices;
   selecting, via the computing device, at the streaming system, first reserved aggregate allocated bandwidth, from a plurality of discrete selectable allocated bandwidths available at the streaming system, the first reserved aggregate allocated bandwidth selected based on the actual allocated bandwidth for the respective videos, the first reserved aggregate allocated bandwidth for streaming the respective videos to video-playing devices;
   monitoring, via the computing device, used bandwidth for streaming the respective videos to the video-playing devices from the streaming system; and in response to determining, via the computing device, that the used bandwidth is within a threshold value of the first reserved aggregate allocated bandwidth:

selecting, via the computing device, second reserved aggregate allocated bandwidth, from the plurality of discrete selectable allocated bandwidths for streaming the respective videos to the video-playing devices, the second reserved aggregate allocated bandwidth selected based on the respective differences between the reserved allocated bandwidth and the actual allocated bandwidth for the respective videos.

2. The method of claim 1, further comprising:

determining, at the computing device, capped allocated bandwidth, wherein the first reserved aggregate allocated bandwidth and the second reserved aggregate allocated bandwidth are selected to be less than the capped allocated bandwidth, the capped allocated bandwidth determined from the actual allocated bandwidth and the respective differences, adjusted by a predetermined capping factor.

3. The method of claim 1, wherein the first reserved aggregate allocated bandwidth and the second reserved aggregate allocated bandwidth are further selected based on respective estimates of respective bandwidth to be used to stream the respective videos, from the streaming system, in respective time periods.

4. The method of claim 1, wherein reserved allocated bandwidth is selected from a plurality of discrete reserved allocated bandwidths.

5. The method of claim 1, wherein the actual allocated bandwidth is limited to being less than the reserved allocated bandwidth.

6. The method of claim 1, wherein the reserved allocated bandwidth is different for two or more of the respective videos.

7. The method of claim 1, wherein the first reserved aggregate allocated bandwidth is selected for a first time period, and selecting the second reserved aggregate allocated bandwidth occurs within a given time before an end of the first time period.

8. The method of claim 1, wherein the first reserved aggregate allocated bandwidth is selected for a first time period, and the second reserved aggregate allocated bandwidth is selected for a second time period following the first time period.

9. The method of claim 1, further comprising, in response to determining that the used bandwidth is below a given one of the plurality of discrete selectable allocated bandwidths, the given one of the plurality of discrete selectable allocated bandwidths below the first reserved aggregate allocated bandwidth:

selecting the given one of the plurality of discrete selectable allocated bandwidths for streaming the respective videos to the video-playing devices.

10. The method of claim 1, further comprising, in response to determining that one or more of the first reserved aggregate allocated bandwidth and the second reserved aggregate allocated bandwidth exceeds capped allocated bandwidth:

communicating with the client devices to negotiate changes to one or more of the reserved allocated bandwidth and the actual allocated bandwidth.

11. A device comprising:

a communication interface configured to communicate with a streaming system; and, a controller configured to:

determine respective differences between reserved allocated bandwidth and actual allocated bandwidth for respective videos provided to the streaming system by client devices;

select, via the communication interface, at the streaming system, first reserved aggregate allocated bandwidth, from a plurality of discrete selectable allocated bandwidths available at the streaming system, the first reserved aggregate allocated bandwidth selected based on the actual allocated bandwidth for the respective videos, the first reserved aggregate allocated bandwidth for streaming the respective videos to video-playing devices;

monitor, via the communication interface, used bandwidth for streaming the respective videos to the video-playing devices from the streaming system; and in response to determining that the used bandwidth is within a threshold value of the first reserved aggregate allocated bandwidth:

select, via the communication interface, second reserved aggregate allocated bandwidth, from the plurality of discrete selectable allocated bandwidths, for streaming the respective videos to the video-playing devices, the second reserved aggregate allocated bandwidth selected based on the respective differences between the reserved allocated bandwidth and the actual allocated bandwidth for the respective videos.

12. The device of claim 11, wherein the controller is further configured to:

determine capped allocated bandwidth, wherein the first reserved aggregate allocated bandwidth and the second reserved aggregate allocated bandwidth are selected to be less than the capped allocated bandwidth, the capped allocated bandwidth determined from the actual allocated bandwidth and the respective differences, adjusted by a predetermined capping factor.

13. The device of claim 11, wherein the first reserved aggregate allocated bandwidth and the second reserved aggregate allocated bandwidth are further selected based on respective estimates of respective bandwidth to be used to stream the respective videos, from the streaming system, in respective time periods.

14. The device of claim 11, wherein the reserved allocated bandwidth is selected from a plurality of discrete reserved allocated bandwidths.

15. The device of claim 11, wherein the actual allocated bandwidth is limited to being less than the reserved allocated bandwidth.

16. The device of claim 11, wherein the reserved allocated bandwidth is different for two or more of the respective videos.

17. The device of claim 11, wherein the first reserved aggregate allocated bandwidth is selected for a first time period, and selecting the second reserved aggregate allocated bandwidth occurs within a given time before an end of the first time period.

18. The device of claim 11, wherein the first reserved aggregate allocated bandwidth is selected for a first time period, and the second reserved aggregate allocated bandwidth is selected for a second time period following the first time period.

19. The device of claim 11, wherein the controller is further configured to, in response to determining that the used bandwidth is below a given one of the plurality of discrete selectable allocated bandwidths, the given one of the plurality of discrete selectable allocated bandwidths below the first reserved aggregate allocated bandwidth:
   select the given one of the plurality of discrete selectable allocated bandwidths for streaming the respective videos to the video-playing devices.

20. The device of claim 11, wherein the controller is further configured to, in response to determining that one or more of the first reserved aggregate allocated bandwidth and the second reserved aggregate allocated bandwidth exceeds capped allocated bandwidth:
   communicate, via the communication interface, with the client devices to negotiate changes to one or more of the reserved allocated bandwidth and the actual allocated bandwidth.

\* \* \* \* \*